United States Patent [19]

Kanda

[11] Patent Number: 4,983,898
[45] Date of Patent: Jan. 8, 1991

[54] METHOD AND SYSTEM FOR CHANGING CONTROL PARAMETERS IN ACCORDANCE WITH STATE OF PROCESS IN PROCESS CONTROL

[75] Inventor: Masae Kanda, Kawagoe, Japan
[73] Assignee: Kabushiki Kaisha Toshiba, Kawasaki, Japan
[21] Appl. No.: 482,017
[22] Filed: Feb. 20, 1990

[30] Foreign Application Priority Data

Feb. 23, 1989 [JP] Japan .................... 1-43492

[51] Int. Cl.$^5$ ............................ G05B 13/04
[52] U.S. Cl. .................... 318/561; 318/610; 318/611; 364/150; 364/157; 364/161
[58] Field of Search ........... 318/601, 561, 609, 610; 364/167.01, 183, 157, 158, 162, 165, 148, 152, 150, 161, 182, 187, 189, 188, 179

[56] References Cited

U.S. PATENT DOCUMENTS

| | | |
|---|---|---|
| 3,798,426 | 3/1974 | Bristol, II . |
| 4,368,510 | 1/1983 | Anderson ................ 318/561 X |
| 4,407,013 | 9/1983 | Arcara et al. .......... 318/561 X |
| 4,451,878 | 5/1984 | Shigemasa ............. 364/157 X |
| 4,539,633 | 9/1985 | Shigemasa et al. ....... 318/561 X |
| 4,563,734 | 1/1986 | Mori et al. ............ 318/610 X |
| 4,607,326 | 8/1986 | Mori et al. ............ 364/162 |
| 4,855,674 | 8/1989 | Murate et al. ......... 318/610 X |
| 4,881,160 | 11/1989 | Sakai et al. ........... 364/161 |
| 4,882,526 | 11/1989 | Iino et al. ............ 364/150 X |

FOREIGN PATENT DOCUMENTS 59-167707  9/1984  Japan .
63-138402  6/1988  Japan .

OTHER PUBLICATIONS

Measurement and Control, vol. 27, No. 4, pp. 305–311, Society Shigemasa, Yutaka Iino, and Masae Kanda.

Primary Examiner—Paul Ip
Attorney, Agent, or Firm—Oblon, Spivak, McClelland, Maier & Neustadt

[57] ABSTRACT

A determination and control section of a process control system samples a set value, a difference value, a manipulated variable, and a controlled variable to determine a state of a process. When it is determined that the process is in an unstable state, an adaptive unit estimates a dynamic characteristic of the process, and calculate PID control parameters using a partial model matching method in a frequency region. When it is determined that the process is in an insufficient response state, the PID control parameter is regulated without operating the adaptive unit to decrease the gain of the process control system.

10 Claims, 4 Drawing Sheets

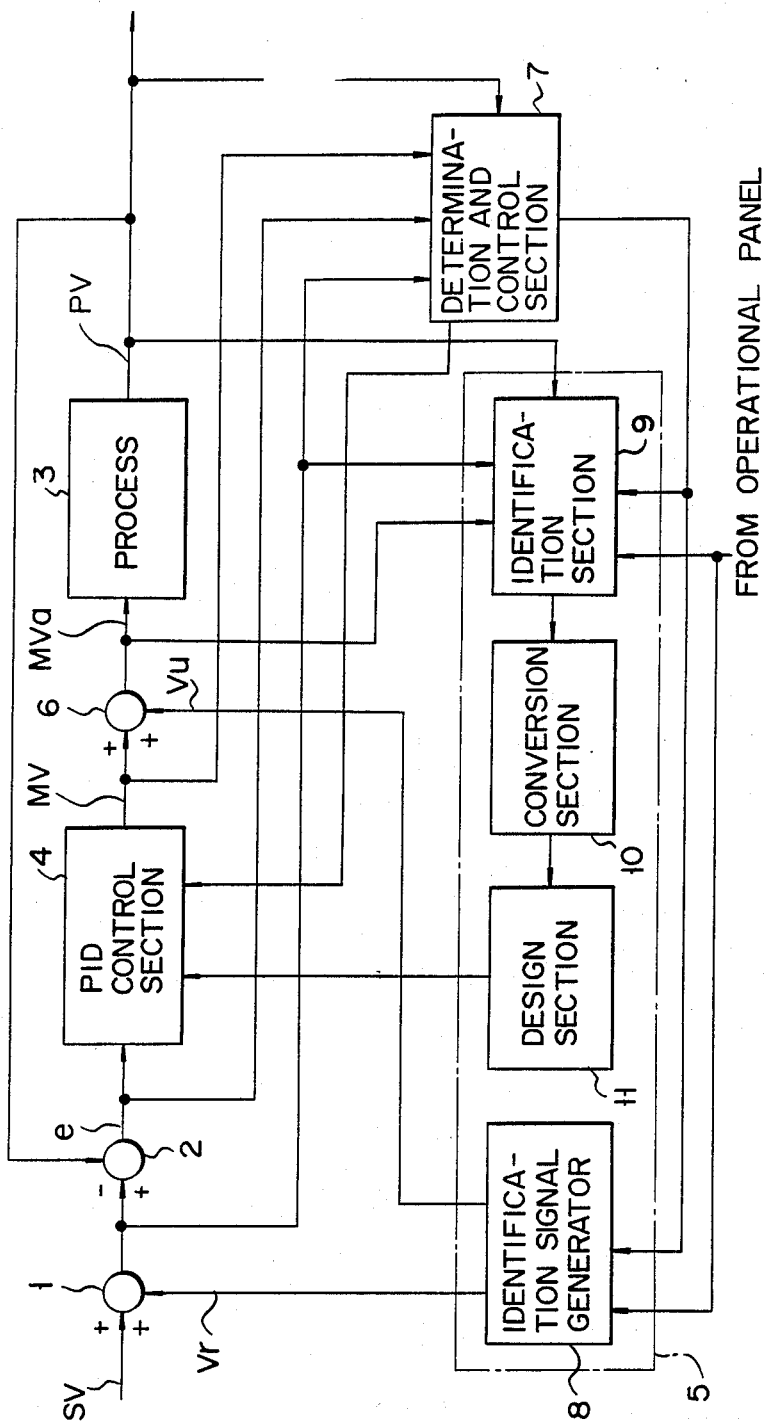
F I G. 1

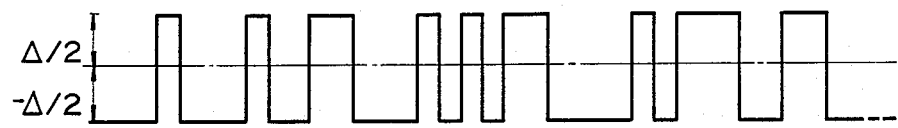
F I G. 2A
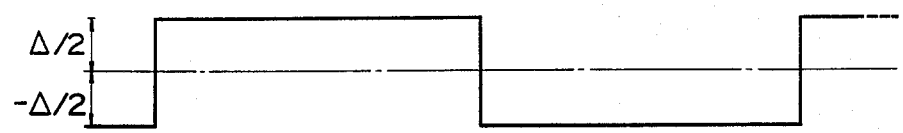
F I G. 2B
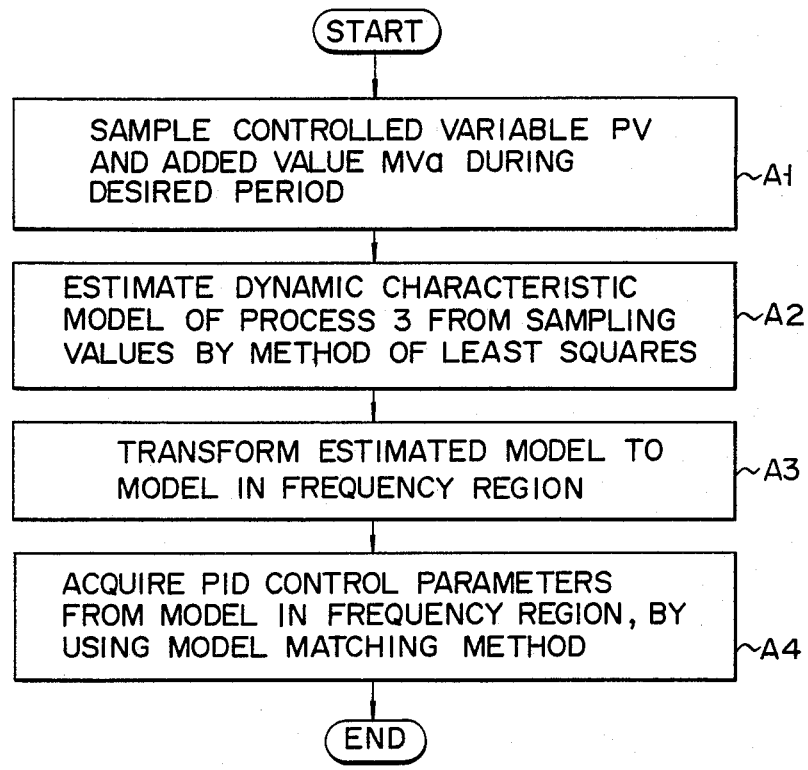
F I G. 3

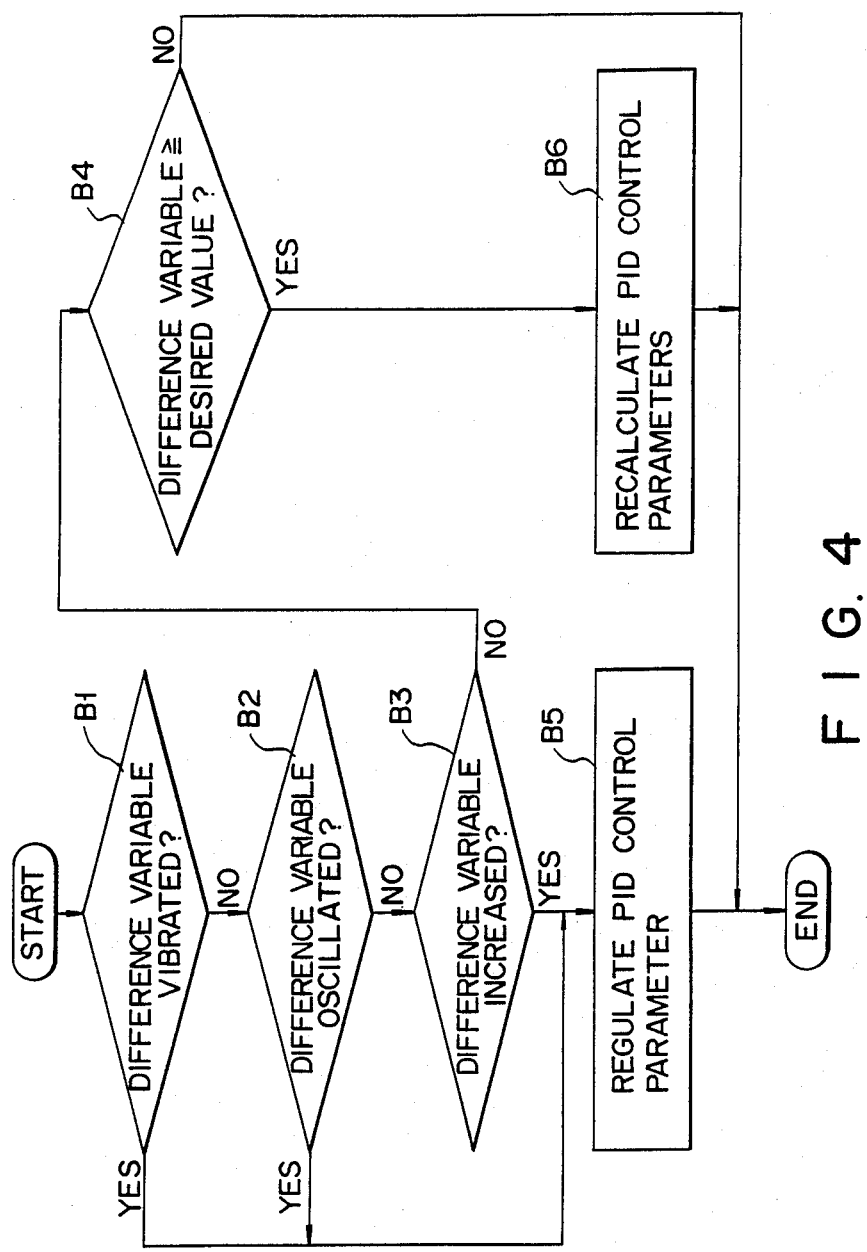
F I G. 4

METHOD AND SYSTEM FOR CHANGING CONTROL PARAMETERS IN ACCORDANCE WITH STATE OF PROCESS IN PROCESS CONTROL

BACKGROUND OF THE INVENTION

1. Field of the Invention

The present invention relates to a method and system for changing control parameters in accordance with a state of a process in process control.

2. Description of the Related Art

In an adaptive control apparatus for monitoring and controlling a state of a process, a difference between an externally input set value SV and a controlled variable PV output from a process such as a plant, i.e., a difference value e (SV−PV) is acquired. For the difference value e, PID (Proportional plus Integral plus Derivative) control parameters are calculated, thereby acquiring a manipulated variable MV. The manipulated variable MV is supplied to the process. The process operates in accordance with the supplied manipulated variable MV to output the controlled variable PV.

The PID control parameters used for acquiring the manipulated variable MV must be set in advance. Therefore, an adaptive control apparatus using an auto-tuning method or a self-tuning method for optimally calculating PID parameters has been developed.

However, in the adaptive control apparatus, a unit for calculating PID control parameters is independent of a unit for monitoring and controlling the process. More specifically, when an identification signal is supplied to the process, dynamic characteristics of the process are identified by analyzing a response signal output from the process, and the PID control parameters are calculated in accordance with the identification result. The set PID control parameters are not recalculated unless the process is changed.

Therefore, when a control system including the process is oscillated or vibrated or the difference value e is increased due to a sudden change in set value SV or a disturbance, the manipulated variable MV obtained by using the initially set PID control parameters is supplied to the process. As a result, a considerable time may be required until convergence of the control system, or the control system can no longer converge. In this manner, in order to maintain a normal control system, monitoring of the process and set of PID control parameters must be performed in correspondence with each other.

Meanwhile, when a controlled variable PV sampled for a predetermined cycle and supplied from the process exceeds a predetermined value, an adaptive control apparatus for recalculating PID control parameters has been developed. However, since calculations of PID control parameters require much time, it cannot immediately cope with a sudden change in state of a control system.

The conventional adaptive control apparatus does not perform control processing against a response error which takes much time until the controlled variable PV converges to the set value SV.

As can be seen from the above description, a demand has arisen for an adaptive control apparatus which can change PID control parameters in accordance with a change in state of a process.

SUMMARY OF THE INVENTION

It is an object of the present invention to provide a method and system for changing control parameters in accordance with a state of a process in process control.

According to one aspect of the present invention, there is provided a method for changing control parameters in accordance with a state of a process in process control, the method comprising the steps of:

detecting at least one variable representing the state of the process during a monitoring period;

determining the state of the process in accordance with a changing of the detected variable; and changing at least one control parameter in accordance with a determination result.

According to another aspect of the present invention, there is provided a system for changing control parameters in accordance with a state of a process in process control, the system comprising:

detecting means for detecting at least one variable representing the state of the process during a monitoring period;

determining means for determining the state of the process in accordance with a changing of the detected variable; and changing means for changing at least one control parameter in accordance with a determination result.

BRIEF DESCRIPTION OF THE DRAWINGS

FIG. 1 is a block diagram showing an arrangement of a process control system according to an embodiment of the present invention;

FIGS. 2A and 2B are timing charts showing an identification signal;

FIG. 3 is an operation flow chart in an adaptive unit of this system;

FIG. 4 is an operation flow chart in a determination and control section of this system;

DETAILED DESCRIPTION OF THE PREFERRED EMBODIMENTS

Figure 5A:
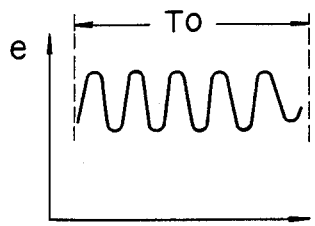
FIGS. 5A to 5D are graphs showing changes in difference value and in controlled variable as a function of a change in state of a process.

An embodiment of the present invention will be described below.

In FIG. 1, an embodiment system comprises adders 1 and 6, a subtracter 2, a process 3, a PID control section 4, an adaptive unit 5, and a determination and control section 7.

An externally input set value SV is input to the subtracter 2 through the adder 1.

The subtracter 2 subtracts a controlled variable PV from the process 3 from the set value SV, and outputs a difference value e to the PID control section 4.

The PID control section 4 executes PID calculations using PID control parameters set by the adaptive unit 5, and supplies a manipulated variable MV obtained by the PID calculations to the process 3 through the adder 6.

The process 3 outputs the controlled variable PV in correspondence with the supplied manipulated variable MV. The controlled variable PV output from the process 3 is input to the subtracter 2, the adaptive unit 5, and the determination and control section 7.

The adaptive unit 5 comprises an identification signal generator 8, an identification section 9, a conversion section 10, and a design section 11.

The identification signal generator 8 generates identification signals Vr and Vu. When this system is to be identified, the identification signal Vr is output to the adder 1. When the process 3 is to be identified, the identification signal Vu is output to the adder 6. In this embodiment, a case will be explained wherein the process 3 is to be identified.

As the identification signals Vr and Vu generated by the identification signal generator 8, for example, an M-series signal (FIG. 2A) and a step signal (FIG. 2B) are used. The identification signals Vr and Vu provide a small change $\pm\Delta/2$ to the set value SV and the manipulated variable MV. The amplitudes of the identification signals Vr and Vu are set to be small enough not to influence the operation of the system. When the M-series signal is used, the process or the like can be precisely identified over a wide frequency band.

The PID control parameters to be set in the PID control section 4 are calculated by the adaptive unit 5 in accordance with the flow chart shown in FIG. 3.

When a control signal is input from an operational panel (not shown) or the determination and control section 7 to the adaptive unit 5, the identification signal Vu generated by the identification signal generator 8 is input to the adder 6.

In step A1, an added value MVa (=MV+Vu) input to the process 3 and the controlled variable PV output from the process 3 in response to the added value MVa are sampled by the identification section 9 every desired period. When the number of sampling processes reaches a desired number, output of the identification signal from the identification signal generator 8 is stopped.

In step A2, a dynamic characteristic model of the process 3 is estimated by the identification section 9 on the basis of the sampled added value MVa and the controlled variable PV using the method of least squares.

In step A3, the estimated dynamic characteristic model is transformed to a model in a frequency region by the conversion section 10.

In step A4, PID control parameters are calculated by the design section 11 on the basis of the transformed model in the frequency region using a partial model matching method (Takashi Shigemasa, Yutaka Iino, and Masae Kanda: Measurement and Control, Vol. 27, No. 4, pp. 305–311, Society of Instrumentation and Control Engineering, 1988). The calculated PID control parameters are input to the PID control section 4.

The set value SV output from the adder 1, the difference value e output from the subtracter 2, the manipulated variable MV output from the PID control section 4, and the controlled variable PV output from the process 3 are input to the determination and control section 7.

The determination and control section 7 monitors and determines a state of the process 3 in accordance with the flow chart shown in FIG. 4, and controls the PID control section 4 and the adaptive unit 5 in accordance with the determination result. More specifically, changes in set value SV, difference value e, manipulated variable MV, and controlled variable PV during a predetermined period T0 are detected, and the state of the process 3 is determined in accordance with the detection results.

In step B1, it is checked if the difference, value e is vibrated during the predetermined period T0, as shown in FIG. 5A.

If YES in step B1, it is determined that the process 3 is unstable, and the PID control parameter set in the PID control section 4 are regulated (step B5). More specifically, when the difference value e input to the PID control section 4 is constant, the PID control parameter is regulated so that the manipulated variable MV output from the PID control section 4 is decreased. For example, only a parameter associated with a P operation, i.e., a proportional sensitivity of the PID control parameters is regulated. Thus, the gain of the control system is equivalently decreased.

Figure 5B:
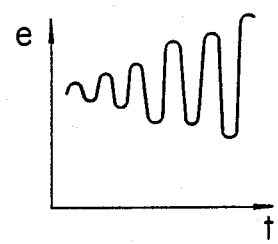

If NO in step B1, it is checked in step B2 if the difference value e is oscillated, as shown in FIG. 5B.

If YES in step B2, it is determined that the process 3 is unstable, and the above-mentioned processing in step B5 is executed.

Figure 5C:
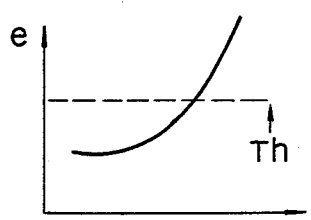

If NO in step B2, it is checked in step B3 if the difference value e is increased beyond an allowance Th, as shown in FIG. 5C.

If YES in step B3, it is determined that the process 3 is unstable, and the above-mentioned processing in step B5 is executed.

Figure 5D:
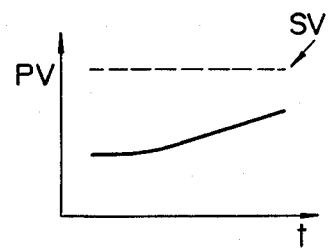

If NO in step B3, it is checked in step B4 if the controlled variable PV converges to the set value SV, as shown in FIG. 5D.

If the controlled variable PV cannot converge to the set value SV after the lapse of a predetermined period of time, i.e., the difference value e is larger than a desired value, it is determined that the process 3 is in a response error state. Therefore, it is determined that the state of the process 3 is changed, and the PID control parameters become undesirable values.

In step B6, the PID control parameters are recalculated. More specifically, the adaptive unit 5 recalculates the PID control parameters in accordance with the flow chart shown in FIG. 3.

According to this system, when an abnormality occurs in the process 3, the determination and control section 7 determines the state of the process 3. Furthermore, the PID control parameters of the PID control section 4 are regulated without operating the adaptive unit 5 so that the gain of the control system is decreased. Therefore, when the response from the process 3 represents a vibrated, oscillated, or increased state, as shown in FIG. 5A, 5B, or 5C, the process 3 can restore a stable state within a short period of time.

As shown in FIG. 5D, when the controlled variable PV cannot satisfactorily follow the set value SV, it is determined that the process is in an insufficient response state. Therefore, the adaptive unit 5 recalculates the PID control parameters after the state of the process is changed, and sets the recalculated PID control parameters in the PID control section 4.

As described above, the state of the process can be determined, and the process control can be executed in accordance with the determination result.

In this embodiment, the process 3 is identified by adding the identification signal Vu to the manipulated variable MV. However, the adder 1 may add the identification signal Vr from the identification signal generator 8 to the set value SV to identify the dynamic characteristics of the entire control system.

Figure 6:
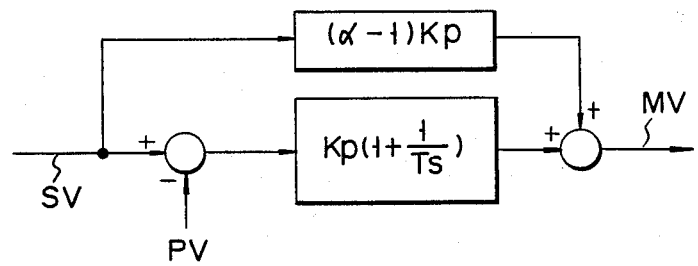
FIG. 6 is a diagram partially showing a target value forward system.

The present invention can be applied to a target value forward type adaptive control apparatus, as shown in FIG. 6.

What is claimed is:

1. A method for changing control parameters in accordance with a state of a process in process control, the method comprising the steps of:
    monitoring at least one characteristic variable representing the state of the process during a monitoring period to obtain a change pattern of the characteristic variable during the monitoring period;
    determining the state of the process in accordance with the obtained change pattern;
    calculating the control parameters to control a desired variable supplied to the process when the change pattern represents an insufficient response; and
    regulating at least one control parameter to control a desired variable supplied to the process when the change pattern represents an unstable response.

2. The method according to claim 1, wherein the calculating step comprises the steps of:
    generating an identification signal;
    subtracting a controlled variable output from the process from a set value to obtain a difference value, the controlled variable being used in a subtraction;
    controlling a manipulated variable in accordance with the difference value;
    adding the identification signal to the manipulated variable to supply an added value to the process;
    sampling the added value and the controlled variable output from the process in response to the added value during a sampling period to obtain sampling values; and
    acquiring control parameters by matching a characteristic model of the process estimated from the sampling values to a reference model of a process control system.

3. The method according to claim 2, wherein the characteristic variable comprises the controlled variable or the difference value.

4. The method according to claim 1, wherein the unstable response comprises a vibration state, an oscillation state, or an increase state.

5. The method according to claim 1, comprising regulating said at least one control parameter to decrease the desired variable.

6. A system for changing control parameters in accordance with a state of a process in process control, the system comprising:
    monitoring means for monitoring at least one characteristic variable representing the state of the process during a monitoring period to obtain a change pattern of the characteristic variable during the monitoring period;
    determining means for determining the state of the process in accordance with the obtained change pattern;
    process control means for controlling a desired variable supplied to the process in accordance with at least one control parameter to be set;
    control parameter calculating means for calculating the control parameters and for setting the calculated control parameters to the process control means when the change pattern represents an insufficient response; and
    control parameter regulating means for regulating said at least one control parameter and for setting the control parameters including at least one regulated control parameter to the process control means when the change pattern represents an unstable response.

7. The system according to claim 6, wherein the control parameter calculating means comprises:
    generating means for generating an identification signal;
    subtracting means for subtracting a controlled variable output from the process from a set value to obtain a difference value, the controlled variable being supplied to the subtracting means;
    controlling means for controlling a manipulated variable in accordance with the difference value;
    adding means for adding the identification signal to the manipulated variable so as to supply an added value to the process;
    sampling means for sampling the added value and the controlled variable output from the process in response to the added value during a sampling period to obtain sampling values; and
    acquiring means for acquiring the control parameters by matching a characteristic model of the process estimated from the sampling values to a reference model of a process control system.

8. The system according to claim 7, wherein the characteristic variable comprises the controlled variable or the difference value.

9. The system according to claim 6, wherein the unstable response comprises a vibration state, an oscillation state, or an increase state.

10. The system according to claim 6, wherein said at least one control parameter is regulated by the control parameter regulating means to decrease the desired variable.

* * * * *